May 7, 1963

M. J. THEODORE 3,088,608

CARGO HANDLING DEVICE

Filed Dec. 7, 1961

INVENTOR

MICHAEL J. THEODORE

BY

ATTORNEYS

AGENT

United States Patent Office 3,088,608
Patented May 7, 1963

3,088,608
CARGO HANDLING DEVICE
Michael J. Theodore, West Roxbury, Mass., assignor, by mesne assignments, to the United States of America as represented by the Secretary of the Navy
Filed Dec. 7, 1961, Ser. No. 157,862
2 Claims. (Cl. 214—77)

This invention relates generally to cargo handling devices and more particularly to such devices where employed to load and unload cargo from vehicles.

In the field of cargo carriers there exists a continuing problem of providing an expedient and economical means of loading and unloading cargo therefrom. This problem is particularly acute in the case of cargo carriers which must operate in remote environs where there is not available some means of facilitating loading and unloading, an example being the operation of cargo type helicopters, although the problem may be as well encountered in any of the many modes of transporting cargo. Basic to this problem is the inexpediency of providing each vehicle with a means for accomplishing its own loading and unloading, which inexpediency flows from the fact that there is a lack of cheap yet practical means for accomplishing the job. The need is apparent for an efficient means for accomplishing this job which is of sufficient economy to render it feasible to provide such a means to be carried with each vehicle. Also highly desirable is the provision of such a means which is highly portable and interchangeable and which may be installed in its operative position and removed therefrom, quickly, surely, and easily.

It is therefore an object of this invention to provide a cargo handling device which is light in weight and highly portable and susceptible to quick installation and removal.

A further object of the invention is to provide a cargo handling device of extreme flexibility and economy of manufacture.

Another object of this invention is to provide a cargo handling device which is susceptible to incorporation with existing auxiliary equipment found on many cargo carriers, particularly cargo-type helicopters.

Yet another object of the invention is to provide a cargo handling device which is made up of stock material widely available.

According to the present invention, the foregoing and other objects are attained by providing a pivoted beam and carriage which is actuated by a powered winch that comprises standard auxiliary equipment on many cargo-type helicopters, which winch is available for use in a variety of other tasks. This device renders it possible for a helicopter to discharge and take on cargo quickly with little modification, which device is quickly demountable after the handling operation has been completed.

Other objects and many of the attendant advantages of this invention will be readily appreciated as the same becomes better understood by reference to the following detailed description when considered in connection with the accompanying drawings wherein.

Figure 1:
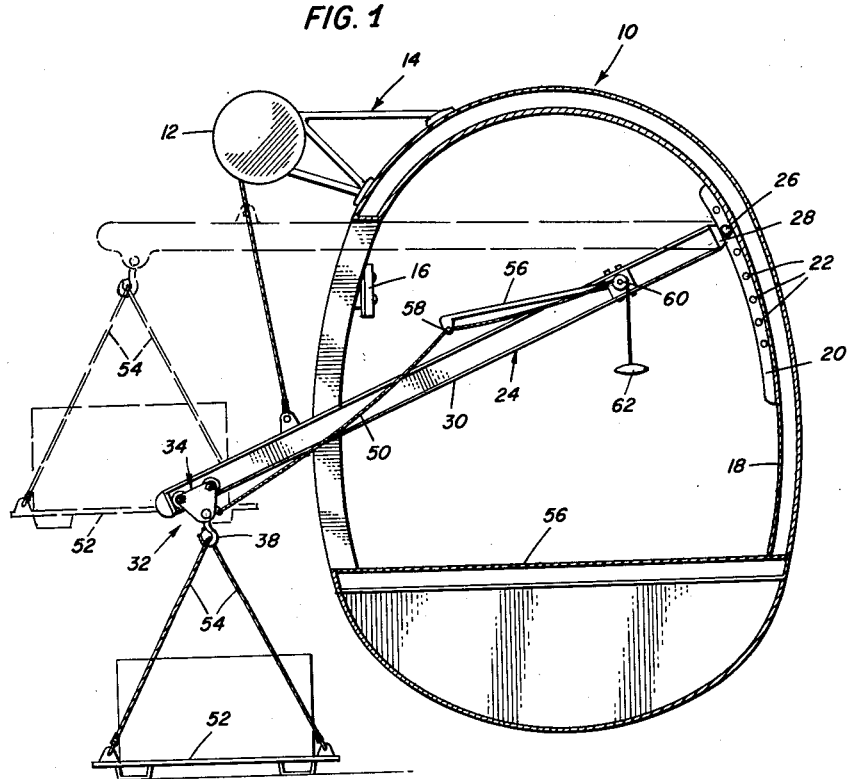
FIG. 1 is a cross sectional view of a typical aircraft fuselage showing one possible installation of the invention.

Referring now to the drawings wherein like reference numerals designate identical or corresponding parts throughout the several views, and more particularly to FIG. 1, there is depicted a typical installation of the invention wherein the cargo handling device is mounted in an aircraft fuselage 10. It should be noted, however, that the installation depicted is merely exemplary of the many environments in which the invention will have utility as, for example, on land vehicles and ships. A particularly convenient installation would be that of helicopters, many of which are provided with an exteriorly mounted winch electrically powered to selectively reel a cable in and out. Returning to the installation shown, there is depicted a typical rescue hoist 12 mounted exteriorly of helicopter fuselage 10 by means of suitable brackets 14. This rescue hoist may comprise a conventional electrically powered winch with its associated switch control box 16 which may be conveniently located in the vicinity of the cargo handling installation.

Mounted on an interior wall 18 of fuselage 10 is a vertically extending channel 20 suitably curved to conform to surface 18. This channel may conveniently be of substantially U-shaped cross section and has pairs of horizontally disposed holes 22 formed therein throughout its length for purposes that will later become apparent. A flanged beam 24 is pivotally mounted within channel 20 by means of a quick disconnect pin 26 which may be inserted through a selected pair of holes 22 in channel 20 and through a hole formed in an extended portion 28 of the web portion of beam 24. This type of connection will allow for ready adjustability for varying loading requirements.

Beam 24 may be of any desired cross sectional configuration insofar as there is provided a flanged portion 30 along its lower edge, a convenient configuration being that of the standard I-beam.

Figure 2:
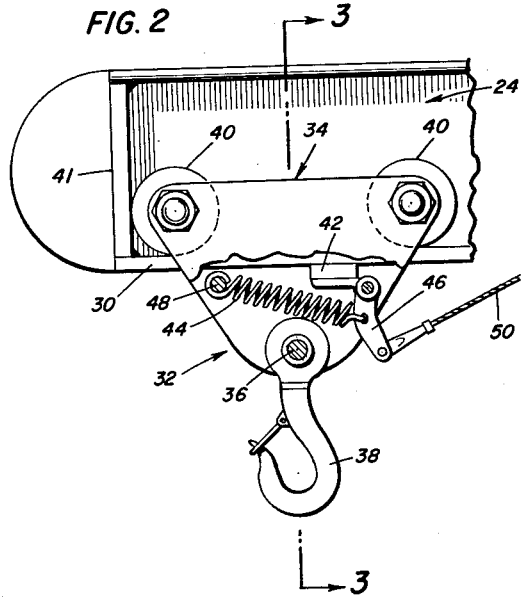
FIG. 2 is an enlarged detail of the carriage.
Figure 3:
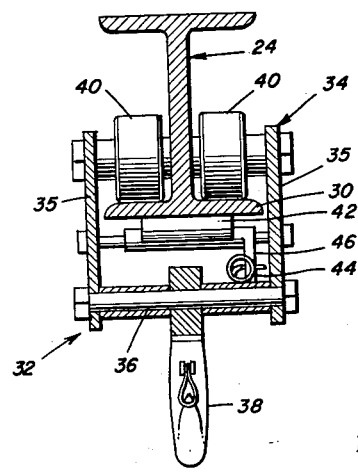
FIG. 3 is a vertical sectional view taken substantially on the line 3—3 of FIG. 2.

Mounted to reciprocate along beam 24 on the lower flange 30 thereof is a carriage 32, best shown in FIGS. 2 and 3. The carriage comprises a body portion 34 of substantially U-shaped cross section having upstanding leg portions 35 and a shank portion 36, in the form of a shaft, joining the lower ends of said leg portions. Depending from the shank portion 36 of the carriage 32 is a suitable hook means 38 to which may be attached various cargo handling harnesses. At the upper end of leg portions 34 there is provided suitable rollers 40 mounted to roll along the upper surface of lower flange 30 of the beam 24. It may be noted here that the free end of beam 24 is provided with an abutment 41 to prevent the accidental escape of carriage 32 when the beam is lowered below a horizontal position. The carriage may be provided with a suitable brake means preferably of the type that will maintain an engaged, braking attitude except when manually actuated to its released position. One possible form of such a brake is illustrated as having a pivoted brake shoe which is spring biased to a beam engaged, braking position by means of spring 44 connected at one end to crank arm 46 and at the other end to the body of the carriage 30 by means of rivet 48. A steel control cable 50 is likewise connected to crank arm 46 and extends along substantially the entire length of beam 24 to terminate in the vicinity of the pivot connection 26. A slack take-up apparatus may be provided to maintain cable 50 in a non-interfering position when carriage 32 is caused to assume a position proximate to the mounted end of beam 24. Such an apparatus may take the form of a pivoted arm 56 resiliently mounted adjacent the fixed end of the beam to normally assume the position illustrated in FIG. 1 when carriage 32 is positioned toward the free end of the beam. Arm 56 is provided with an integral eyelet 58 formed at its free end and a pulley 60 at its mounted end to receive and guide cable 50 as the latter is actuated by a handle 62. When carriage 32 is caused to move toward the mounted end of beam 24, arm 56, by virtue of its resilient mounting, is allowed to move in a clockwise direction thereby assisting in taking up any slack that may develop.

In a loading operation, the carriage 32 is caused to move to the outer, free end of beam 24 by manually actuating cable 50 to release brake shoe 42 and lowering beam 24 to a position somewhat below the horizontal, whereby gravity will cause the carriage to move to the outer end of the beam, whereupon control cable 50 is released to lock the carriage at the outer, free end of the beam 24. The beam is then further lowered by actuation of suitable winch controls 16 to a position in which a pallet 52 and its associated harness 54 will, when hung from hook member 38, come to rest upon the ground surface from which the cargo is to be loaded. Pallet 52 is then loaded and winch 12 is actuated by control 16 to raise beam 24 to a position slightly above the horizontal, whereupon control cable 50 is again manually actuated to release brake 42 causing the carriage to roll along beam 24 to the interior of the fuselage. When the carriage has reached the desired point on the beam, control cable 50 is released thereby again locking brake 42. Actuation of winch 12 to lower beam 24 slightly will cause the pallet to come to rest on the fuselage floor 56, whereupon the load may be shifted from the pallet and another loading operation may be commenced.

Obviously numerous modifications and variations of the present invention are possible in the light of the above teachings. It is therefore to be understood that within the scope of the appended claims the invention may be practiced otherwise than as specifically described therein.

What is claimed is:

1. In a cargo handling device, the combination of an aircraft fuselage substantially elliptical in configuration,
   an arcuate channel member attached within and on one side of said fuselage,
   a cargo passageway on the other side of said fuselage,
   a beam pivotally and adjustably mounted at one end thereof to the arcuate channel member and extending through and beyond said cargo passageway,
   an eye carried by said beam at one end thereof and disposed between the flanges of said channel member, said channel member having a plurality of mutually spaced apertures therein and cooperating with said eye,
   a pin selectively positioned in said apertures and the eye on the beam for pivotally and adjustably mounting the beam on the channel member,
   a carriage movably mounted to reciprocate along the beam,
   a spring-biased lever pivotally mounted on said carriage,
   a brake shoe carried by said lever and engageable with the beam to lock said carriage at a desired position along the beam,
   a flexible brake control element having one end secured to said lever and the other end thereof secured to an actuating member in the body for selectively disengaging the brake shoe from the beam whereby the carriage may be moved along the beam to the locked positions,
   a pivoted arm resiliently mounted at one end on the beam and having an eyelet at the other end thereof for receiving said flexible element, said arm being movable in a clockwise direction to take up the slack in the flexible element as the carriage moves along the beam in the direction toward the pivoted and adjustable end thereof,
   a power hoist mounted on the exterior of the fuselage above said cargo passageway and operatively connected to said beam near the free end thereof for controlling the movement of the beam during a cargo handling operation, and means connecting said power hoist to the beam.

2. In a cargo handling device, the combination of an aircraft fuselage of substantially elliptical configuration,
   a pair of mutually spaced arcuate supports secured within and on one side of said fuselage,
   a cargo passageway on the other side of said fuselage,
   an elongated beam pivotally and adjustably mounted at one end thereof between said spaced arcuate supports and extending through and beyond said cargo passageway,
   an eye element carried by said beam and disposed between the pair of supports, said spaced arcuate supports having a plurality of pairs of mutually spaced mating apertures therein and cooperating with said eye element,
   a pin selectively positioned in a pair of said plurality of pairs of the mutually spaced mating apertures for pivotally and adjustably mounting the beam between the spaced arcuate supports,
   a carriage mounted on the beam and movable through the passageway into the fuselage when the beam is moved to a position slightly above a horizontal position and out of the fuselage through the passageway when the beam is moved to a position slightly below a horizontal position,
   a lever pivotally mounted on said carriage,
   pin means for pivotally mounting said lever on the carriage,
   a brake shoe carried by said lever,
   spring means attached to the carriage and the lever for maintaining the shoe in braking engagement with the beam,
   a flexible cable having one end secured to said lever,
   remotely operating means disposed within the fuselage and connected to the other end of the flexible cable for selectively disengaging said shoe from the beam,
   a resilient arm pivotally mounted on the beam and connected to said cable and movable in a clockwise direction as the carriage moves toward the arcuate support for taking up slack in the cable, and
   a power winch mounted on the exterior of the fuselage above the passageway and operatively connected to the beam near the free end thereof for moving the beam to said horizontal position to facilitate moving the cargo into and out of the fuselage through the passageway.

References Cited in the file of this patent

UNITED STATES PATENTS

| | | |
|---|---|---|
| 703,444 | Murphy | July 1, 1902 |
| 1,235,472 | Hendrickson | July 31, 1917 |
| 2,580,018 | Goebel et al. | Dec. 25, 1951 |